Nov. 8, 1966 L. HOHOFF 3,284,569

ELECTROMECHANICAL SHIFT REGISTER

Filed April 10, 1963 2 Sheets-Sheet 1

INVENTOR
LEO HOHOFF

BY J J Hamill

ATTORNEY

United States Patent Office 3,284,569
Patented Nov. 8, 1966

3,284,569
ELECTROMECHANICAL SHIFT REGISTER

Leo Hohoff, Park Ridge, Ill., assignor to Teletype Corporation, Skokie, Ill., a corporation of Delaware
Filed Apr. 10, 1963, Ser. No. 272,040
10 Claims. (Cl. 178—52)

This invention relates to a mechanical storage device for electrical signals of first and second conditions and more specifically to a mechanical shift register or storage device for electrical signals received in seriatim order such as those of a telegraph code combination.

Most of the mechanical storage devices for binary signals having a first and second condition have heretofore had a rotatable disc with a gap therein through which stationary flat spring metal elements could be moved by a signal responsive gating means as the gap moves successively past a series of such stationary spring metal elements. When positioning these resilient spring metal elements at high speeds and over a large number of operations, it often happens that the trailing edge of the disc at the gap would hit a spring metal element causing it to shatter or be deformed so that the register would no longer function properly. This was particularly true when this type of device was used for receiving and storing telegraph signals since a tremendously large number of electrical signals must be handled when receiving telegraph messages at a busy station. Also, the speed at which the signals are received results in the timing of the positioning of the spring metal elements relative to the movement of the gap being very critical so that a slight deviation therefrom resulted in destruction or mutilation of a spring metal element.

Other previously known mechanical storage registers for electrical signals employ a stationary disc with a gap therein and a gate for deflecting flat spring metal elements through the gap to either side of the stationary disc as the elements rotate past a gap. In these registers a scanning wiper was needed to rotate across the deflected spring metal elements in order to read out the stored information.

Besides being capable of being deformed, flat spring metal storage elements have other undesirable characteristics such as large mass, flexibility in only one direction and large frictional wear surfaces. The present device eliminates these and other shortcomings of devices employing flat spring metal wipers and additionally is a versatile storage device in that it can store a plurality of telegraph code combinations, can convert seriatim input signals to a plurality of simultaneous output signals or re-time serial input signals and furnish them as serial output signals.

Accordingly, an object of the invention is to provide a mechanical shift register capable of converting serial signals to parallel output signals or capable of providing re-timed serial output signals.

A further object of the invention is to provide a mechanical shift register having storage elements which will not become deformed if they are not positioned properly while moving through a positioning station for them.

A further object of the invention is to provide a mechanical shift register wherein the storage elements are part of an electrical output path and wherein the storage elements are excellent conducting elements.

A still further object of the invention is to provide a mechanical shift register having a plurality of insulated distributor-like segments spaced about the axis of movable storage elements so that the timing of a readout operation is accomplished by a given brush moving across a given segment at a predetermined time.

According to the preferred embodiment of the invention, an electromagnet is provided which is selectively energized by signals of one condition and de-energized by signals of a second condition. As the electromagnet responds to an incoming signal, it operates a gate to cam a brush-like storage element therein to either an inner or outer ring of distributor-like segments on a stator ring. The stator ring has a nonconducting barrier ring thereon which divides the stator ring into these inner and outer ring of segments. When a storage element is positioned within the inner row of the segments, it corresponds to an element of one condition; and when a storage element is positioned in the outer ring of segments, it corresponds to a signal of a second condition. The storage elements are metallic brushes composed of a number of fine strands of wire and they are carried by a common rotor which is rotated by a driving means in timed relationship to the incoming signals so that in each selective cycle of electromagnet, a brush storage element will be moving through the gate for positioning in either the inner or outer ring of segments. The driving means has a Geneva mechanism therein so that the rotor is not driven when a stop or start pulse of a telegraph signal is being received and so that the rotor is driven only during the receipt of intelligence signals by the electromagnet. Thus, only when receiving intelligence elements, will there be an accompanying movement of the rotor and storage elements carried thereby into and through the gate. Each of the electrical readout circuits for a stored signal extends through a common brush, a conductive disc on the rotor, a brush-like storage element, and the distributor segment with which the brush is in contact to a conductor connected to the same segment. If it is desired to read out in seriatim fashion, only one pair of output conductors, individually connected to inner and outer segments, is utilized, whereas when reading out simultaneously in a parallel manner the number of pairs of conductors monitored at one time will be equal to the number of intelligence elements constituting the code combination.

These and other objects will become more apparent when considered in conjunction with the accompanying drawings wherein.

Figure 1:
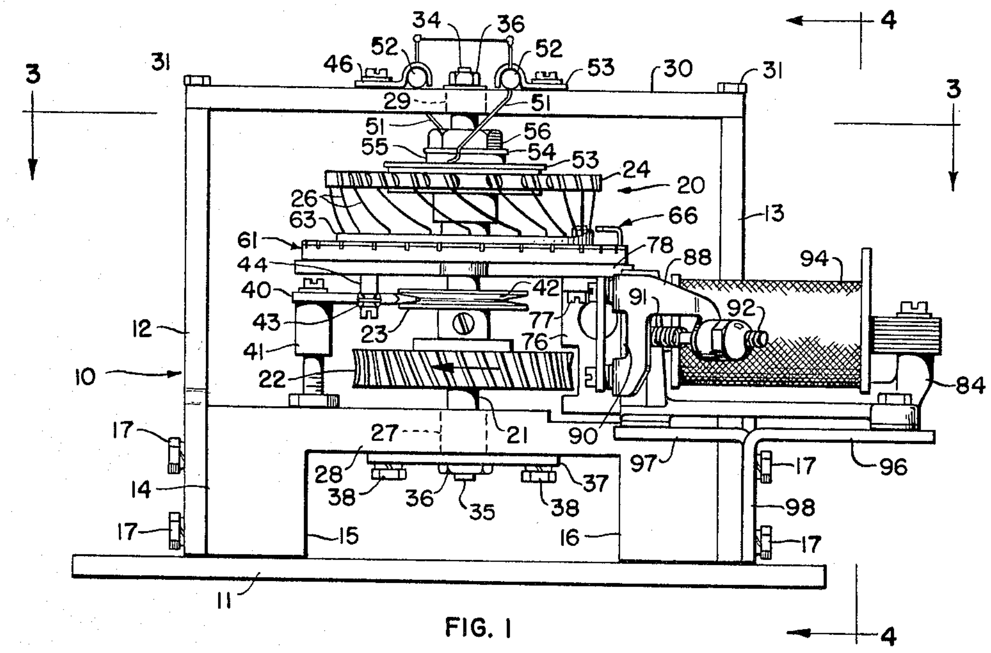
FIG. 1 is a front elevational view of the mechanical shift register according to the preferred embodiment of the invention.

Referring now to the drawings and more particularly to FIG. 1, the mechanical shift register 10 is shown mounted on a base plate 11 from which a pair of opposed side plates 12 and 13 and a rotor support block 14 extend upwardly. The rotor supporting block 14 is of an inverted U-shaped configuration having a downwardly extending pair of opposed legs 15 and 16 which are secured in a suitable manner to the base 11. The side plates 12 and 13 are secured by suitable fasteners 17 to the legs 15 and 16 of the rotor supporting block 14.

A rotor assembly 20 mounted for rotation in the rotor supporting block 14 consists essentially of a rotor shaft 21 to which are secured the following: A driving gear 22 for turning the rotor, a grooved one-way brake drum 23 for preventing reverse movement of the rotor shaft 21, and a rotor support 24 having a plurality of radially extending arms 25 from which extend brushes 26.

The rotor shaft 21 is journalled at its lower end in a bearing 27, carried in a web 28 of the U-shaped rotor supporting block 14 and is journalled at its upper end in a bearing 29 carried by a cross plate 30, which cross plate is secured by suitable fasteners 31 to the side plates 12 and 13. The upper and lower extremities 34 and 35, respectively, of the rotor shaft 21 are threaded and have threaded members 36 frictionally securing the rotor shaft 21 in a vertical position to and between the cross plate 30 and the web 28 of the rotor support block 14. A lower bearing supporting plate 37 is secured by fasteners 38 to the web 28 to hold the lower bearing 27 in position against downward movement.

When the driving gear 22 is rotated, in the direction of the arrow shown in FIG. 1, it will rotate the rotor shaft 21, the radial arms 25, carrying the brushes 26, and the grooved brake drum 23 in the direction of the arrow. A pointed finger 40 rides in a groove 42 in the grooved brake drum 23 and is rotatably mounted on an upstanding adjustable post 41 carried by the rotor supporting block 14. As seen in FIG. 1, the pointed finger 40 is oriented, that is directed, away from the viewer of FIG. 1 so that the rotation of the brake drum 23 in the direction of the arrows shown in FIG. 1 cause the pointed finger 40 to swing further away from the viewer against the tension of a contractile spring 43, which spring is secured between the pointed finger 40 and a stationary dependent post 44. However, if an attempt is made to rotate the gear 22 in the opposite direction to that shown in FIG. 1, the grooved brake drum 23 will then frictionally engage the pointed finger 40 and begin to rotate the pointed finger 40 toward the viewer whereby the pointed finger 40 will move deeper into the groove 42 so as to wedge or lock the shaft 21 against reverse movement. Thus, the finger 40 functions as a one-way brake in that it will permit movement in one direction, but not in the opposite direction.

Figures 3, 4, 5, 6:
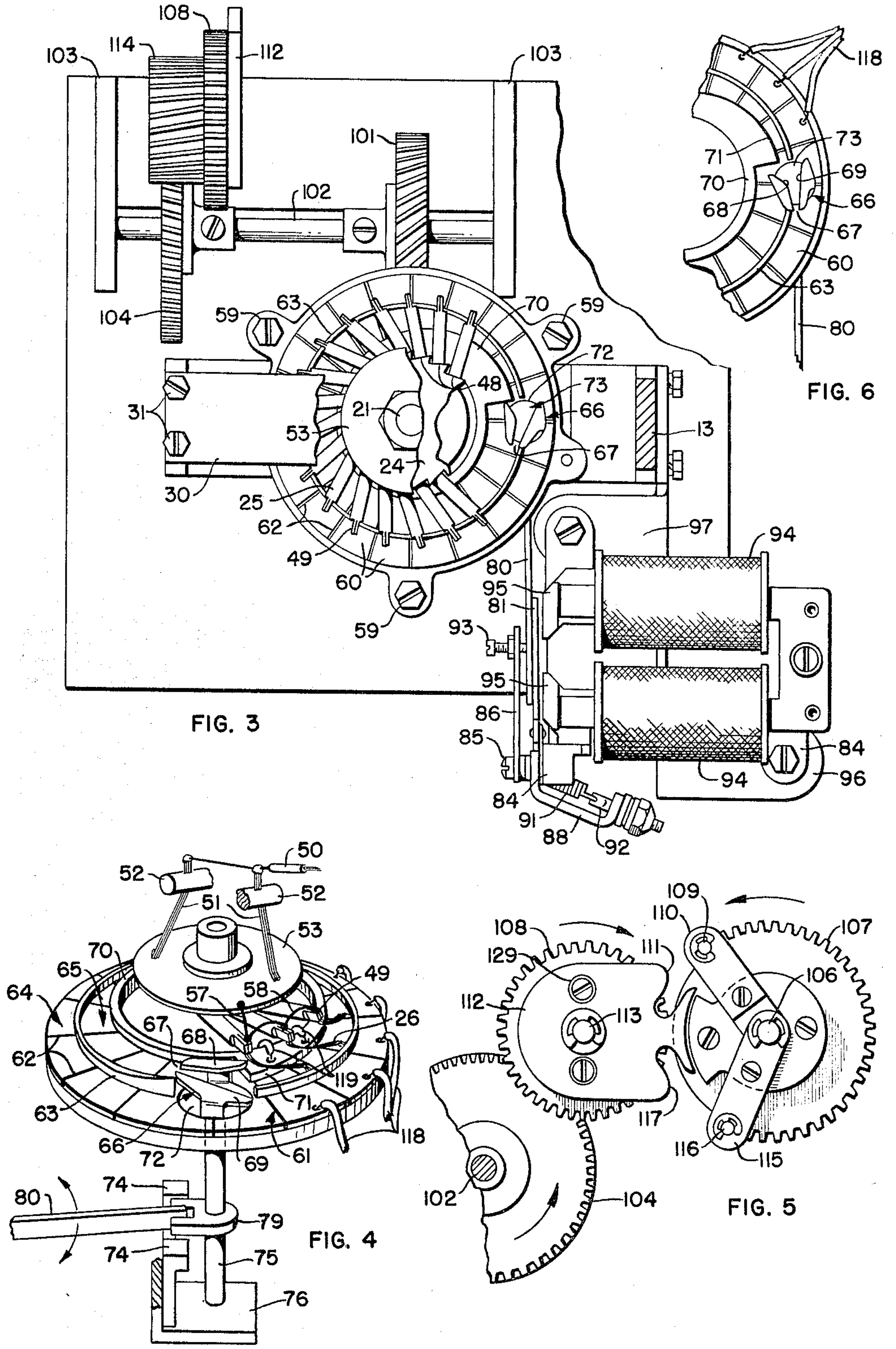
FIG. 3 is a plan view taken along the line 3—3 in FIG. 1 in the direction of the arrows with the top frame cross-plate partially broken away.
FIG. 4 is an enlarged fragmentary perspective view showing the distributor-like segments, gating means and brushes.
FIG. 5 is a detached fragmentary view showing the driving means including the Geneva mechanism for preventing movement of the rotor during the receipt of stop and start signals.
FIG. 6 is an enlarged top view of the gate and a camming means for the brush-like elements according to the preferred embodiment of the invention.

The construction of the rotor support 24, radial arms 25 and brushes 26 can be more easily understood by reference to FIGS. 3 and 4 wherein there are shown the radial arms 25 and brushes 26 in an enlarged detail. More specifically, referring to FIG. 3, the rotor support 24 is an insulating or nonconducting, ratchet-shaped, support having a plurality of individual teeth 48 (FIG. 3) into which are secured radial arms 25. The radial arms 25 are preferably nonconducting plastic rods whose outer extremities are divided into forked ends 49 that are pressed together to clamp therein the individual strands of wire composing the wire brushes 26.

The manner in which the electrical input is furnished from an input lead 50 (FIG. 4) to the brushes 26 will now be described. The electrical input lead 50 is connected to pairs of opposed commutator brushes 51 carried by a pair of opposed brush holders 52 held by clamps 46 (FIG. 1) on the cross plate 30. The electrical path extends from the input lead 50 through the commutator brushes or wipers 51, to a metallic conducting plate 53 supported on the top of the rotor support 24. As may be best seen in FIG. 1, the conducting plate 53 is mounted in engagement with the upper surface of the rotor support 24 and is frictionally urged there against by a spring washer 54 mounted between an insulating washer 55 and a lock nut 56 threaded on the rotor shaft 21.

Since the commutator wipers 51 are in continuous contact with the conducting plate 53 while the rotor shaft 21 is rotating, a conductive path will be continuously made to a lead 57 (FIG. 4) soldered to the conductive plate end to a common lead 58. Common lead 58 encircles the forked ends of the radial arms 25 and is soldered and electrically connected to the upper ends of each of the wire brushes 26.

Figure 2:
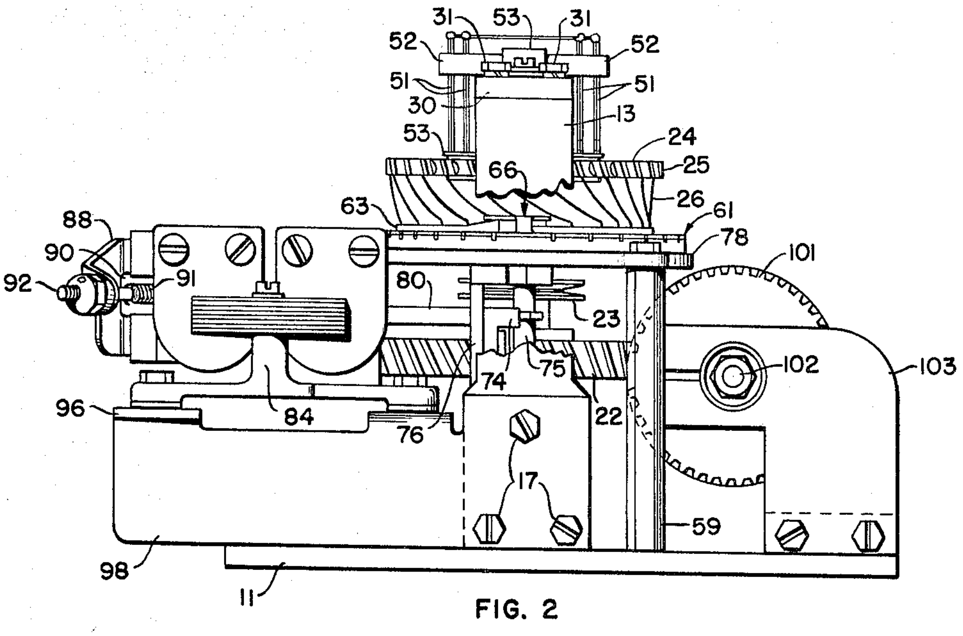
FIG. 2 is a side elevational view taken along the line 4—4 in FIG. 1, in the direction of the arrows, showing the mechanical shift register with some parts broken away to show parts behind them.

From the foregoing it should be apparent that each of the wire brushes 26 is a conductive element which will have continuously applied thereto an electrical current that will be applied to whatever segment 60 of a distributor-like disc 61 with which a given brush 26 is in contact. The distributor-like segments 60 are electrically isolated one from another in an arcuate manner by grooves 62 and are separated from a radially associated segment 60 by a nonconducting barrier ring 63. The barrier ring 63 is situated midway between the inner and outer peripheries of the disc 61 and divides the segments 60 into an outer ring 64 of segments and an inner ring 65 of segments. Both the distributor-like segments 60 and the barrier ring 63 are carried by a circular, nonconducting base 78 supported by three space upstanding posts 59, one of which is shown in FIG. 2.

The number of wire brushes 26 is equal to the number of segments 60 in the inner ring 65, and, in turn, is also equal to the number of segments 60 in the outer ring 64. In the present embodiment, there are twenty segments in each of the rings 64 and 65 and similarly there are 20 brushes. There are twenty radial arms 25 and they are equally spaced about the circumference of the rotor support 24 so that one brush element 26 will be in contact with only one segment 60 at any given instant of time.

As will be more readily apparent from FIGS. 4 and 6, each of the brush elements 26 will enter a gating means 66 during each revolution of the rotor shaft 21 and will be directed or gated into the outer ring 64 or the inner ring 65 of segments 60 depending on the position of the exit opening 67 at the time the brush 26 leaves the gating means 66. The gating means 66 is comprised of a pair of convergent camming walls 68 and 69 forming an enlarged mouth 73 on the upstream side to assure entry of a brush 26 into the interior of the gating means 66 irrespective of whether or not the element 26 was formerly in the outer ring 64 or inner ring 65 of segments 60.

To assist the channeling of the brush elements 26 from the inner ring 65 into the mouth 73 of the gating means 66, an insulated inner ring 70 (FIG. 6) becomes increasingly wide in the radial direction at 71 in the vicinity of the mouth 73 of gating means 66 thereby reducing the radial length of the segments 60 in the inner ring adjacent the mouth 73 of the gating means 66 and thereby assuring that the brushes 26 traveling in the inner ring 65 are cammed or channeled into the mouth 73 of the camming means 66. It is not necessary to have a corresponding channeling means for the outer ring 64 of segments 60 since the brush elements 26 are biased towards and tend to remain in contact with the inner ring 65 and when moved to the outer ring or track 64 will bear lightly against the outer radial surface of the barrier element 63 as they move about the outer ring 64 of segments 60. Hence, the brushes 26 when they are in the outer ring 64 will move directly into the mouth 73 of the gating means 66 and need not be channeled into it.

The camming walls 68 and 69 of the gating means 66 are mounted on a cylindrical bearing portion or circular base 72 secured to the upper end of a vertically extending positioning shaft 75. The lower end of the positioning shaft 75 is supported in a bracket 76 (FIGS. 1, 2 and 4) that is suitably fastened by fastener 77 to the underside of the stator support base 78. A bifurcated member 79 is fixed to the positioning shaft 75 (FIGS. 2 and 4) and the end of an armature extension 80 extends into its forked end, so that when the armature extension 80 is moved in the direction of the arrows shown in FIG. 4, the positioning shaft 75 will be rocked clockwise or counterclockwise to position the exit mouth 67 of the gating means 66 towards the inner ring of segments 65 or the outer ring of segments 64. The amount of rotation of the positioning shaft 75 in the clockwise or counterclockwise directions, respectively, is limited by a pair of spaced stops 74 (FIGS. 2 and 4) carried by the bracket 76.

As best seen in FIG. 3, the armature extension 80 extends outwardly from an armature plate 81 and is suitably fastened thereto. The armature 81 is secured in cantilever fashion by fasteners 85 to a magnet frame support 84. The end of the armature plate is of reduced width and extends into the forked opening 90 (FIGS. 1 and 2) of a spring hanger 88 and is secured to one end of a contractile spring 91, whose opposite end is hooked to an adjustable pin 92 mounted in an aperture in the spring hanger 88.

As seen in FIG. 3, the contractile spring 91 pivots armature 81 in a counterclockwise direction about the magnet support frame 84, and thereby brings the armature extension 80 into engagement with an upstop member 93 threaded in the upstop plate 86.

As the armature 81 and armature extension 80 are urged by the spring 91 against the upstop 93, they position the gating means 66 to direct the wire brushes 26 into the inner ring 65 as shown in FIG. 3, this is the position of the gating means 66 as long as the pair of electromagnets 94 remain deenergized. However, if the electromagnets 94 are energized, they attract the armature plate 81 towards their pole faces 95 and the armature extension 80 rotates therewith in a clockwise direction, as seen in FIG. 3, thereby rotating the member 79 and positioning shaft 75 to rotate the gating means 66 in a counterclockwise direction (FIG. 3) thereby orienting the exit mouth 67 to direct brush element 26 into the outer ring 64 of segments 60.

As best seen in FIGS. 1, 2 and 3, the electromagnets 94 and their support frame 84 are mounted on a pair of horizontal flanges 96 and 97 of a vertically oriented plate 98, that is secured by the fasteners 17 to the U-shaped supporting block 14.

As the electrical signals comprising energizing and deenergizing pulses, which are referred to as marking and spacing signals in the telegraph art, are received and cause the energization and de-energization of electromagnets 94, the electromagnets 94 will cause the gating means 66 to direct the brush elements 26 moving therethrough to the outer ring 64 or inner ring 65 of segments 60. For the brush elements 26 to be properly placed in the appropriate ring or track, it is necessary that the rotational movement of the brush elements 26 be accurately timed in relationship to the positioning of the gating means 66 so that the brush elements 26 moving through the gating means 66 are able to move out of the exit mouth 67 and into either the inner ring 65 or outer ring 64 of segments 60 before the next signal is received. The timing of the movement of these brush-like storage elements and the receiving of the signals by the electromagnets of the present storage device and most prior art devices are such that one and only one storage element is positioned for each signal received. However, a serious problem of timing arises, in the prior art devices, in that a storage element, if it comprises a flat spring metal element, may engage the edge of the disc at the gap through which it is moving and hence be shattered or bent. If the brush-like storage element 26 of the present device engages the barrier ring 63, it will merely divide into strands on either side of the barrier ring 63 for one revolution whereupon the gating means 66 will collect the strands and combine them and position them all on one side of the barrier element 63. Thus, no permanent damage results when a brush element 26 strikes its barrier element 63 in contrast to the permanent damage that results when using spring metal wipers.

To assure the accurate drive of the rotor shaft 21 and radial arm 25 and thereby the brushes 26, a driving power train for the rotor gear 22 has been provided. As seen in FIGS. 2 and 3, the gear 22 is driven by a gear 101 mounted on a horizontal shaft 102 journalled in spaced upstanding plates 103 that are secured to the base plate 11. The gear 101 in turn rotates with the shaft 102 as it is turned by the rotation of a gear 104 which is also fixed to the shaft 102. The train of gears for driving gear 104 is shown in FIGS. 3 and 5.

As seen in FIG. 5, the train of driving gears for the gear 104 includes a Geneva mechanism which is effective to permit the train of gears to be quiescent during the receipt of stop pulse and the succeeding start pulse so that only intelligence pulses will cause a driving of the gear 104 and consequently a rotation of the rotor shaft 21 and brushes 26 through the gating means 66. It is often desired that an incoming train of sequential telegraph signals have their intelligence or code combination signals translated from a sequential order into a simultaneous or parallel order for simultaneously operating a recording unit such as a tape punch. For instance, the punch magnets of a magnet controlled tape punch would simultaneously receive a plurality of pulses corresponding to the intelligence elements of a code combination, but should not receive signals representative of the start and stop pulses of such combination.

As seen in FIG. 5, the shaft 106 is driven at a constant speed by a motor means (not shown) and shaft 106 drives a mutilated gear 107 attached thereto. The gear 107 has teeth extending throughout approximately five-sevenths of its periphery and for approximately two-sevenths of its periphery, the gear teeth have been removed. Thus, while gear 107 will rotate during the start and stop pulses, it does not have teeth in driving engagement with the teeth of its mating gear 108 during this interval.

As seen in FIG. 5, the gear 107 is in the position where a start pulse is to be received. Hence, the gear 104 will remain stationary while the gear 107 is turning to bring a driving pin 109 on an arm 110, which is secured to the gear 107, into a cooperating slot 111 on a plate 112 secured by fasteners 129 to the gear 108. Thus, although the gear 107 will be turning, the gear 108 will remain stationary as will the rotor shaft 21. In this interval the gating means 66 can be positioned by the electromagnets 94, but since no brushes 26 are moving therethrough, the position of the gating means 66 is immaterial as it is not storing a signal by positioning a brush element 26.

At the beginning of the first intelligence pulse the pin 109 will engage the bottom of the slot 111 and will turn gear 108 to rotate the positioner shaft 21 to direct a brush element 26 through the gating means 66. Of course, if this pulse is of a marking nature, the armature 81 will move into engagement with the pole faces 95 turning the gating means 66 in a counterclockwise direction as seen in FIG. 3 to direct the brush element 26 moving therethrough onto the outer ring segments 64.

At this time, the gear teeth immediately following the arm 110 on gear 107 will be in driving engagement with the gear teeth on gear 108 and, during this pulse and the next succeeding four intelligence pulses, gear 107 will be driving the gear 108 and the gear train composed of a pinion gear 114 (FIG. 3) and gear 104. Turning of the shaft 102 by gear 104 rotates gears 101 and 22 and the rotor shaft 21, and thereby moves the next four brush elements 26 through the gating means 66. When the fifth intelligence pulse has been received, it will be followed by a stop pulse, at which time arm 115 of the Geneva mechanism will bring its driving pin 116 out of the corresponding slot 117 on plate 112. As there are no gear teeth succeeding this arm 115, the gear 107 will no longer be in driving engagement with the gear teeth of gear 108 and, hence, the gear 108 will not be driven by the arm 115 during a stop pulse. There is no movement of the gear 108 during the start pulse time period as pin 109 is moving into the slot 111.

As depicted in the preferred embodiment of the invention, the number of segments 60 in the inner and outer rings 64 and 65 of segments totals 40, there being 20 segments in each ring. The inner segments 60 correspond to spacing positions and the outer segments 60 correspond to marking positions. With twenty brushes 26 it is possible to store twenty intelligence elements; that is, the number of intelligence elements in four "Baudot" or telegraph code combinations. As should be apparent, the position of a plurality or a single one of the wire brush elements 26 can be read as it or they move across any given pair of inner and outer segments so that the binary condition or conditions of each pulse of a sequence of pulses can be ascertained.

When it is desired to obtain the binary conditions of the five pulses of a character or code combination simultaneously, it is merely necessary to sample the five outer output leads 118 and five inner output leads 119 to determine the binary condition of each of the five intelligence elements of a code combination. That is, for example, if the brush 26 shown immediately before the gate 66 in FIG. 4 is engaging an inner segment 60 of the inner row of segments 65, it will complete an electrical path through output leal 119 that extends from common input lead 50, commutator wipers 51, conducting plate 53, lead 57, common lead 58, the wire brush 26 engaging inner segment 65 and output lead 119. Of course, there will be no signal or no path completed through the outer segment 60 and its output lead 118 since the outer segment does not haye a brush in engagement therewith. If the second brush element 26 was in engagement with its outer segment 60 rather than its inner segment, it will then complete an electrical path to the second output lead extending from input lead 50, commutator wipers 51, conducting plate 53, lead 57, common lead 58, the brush element 26 in engagement with this outer segment and lead 118.

It should be understood that more than five intelligence elements could be analyzed at any one time. Thus, for example, if it were desired to recognize a sequence of two, three or four code combinations, ten, fifteen or twenty positions could be analyzed simultaneously.

While the preferred embodiment of the invention has illustrated a Geneva mechanism to eliminate the storage of start and stop signals, since a telegraph code has been used as an example of type of signals capable of being stored, it should be recognized that the invention is not so limited since the elimination of the Geneva mechanism would result in the storage of continuously incoming signals. Also it should be recognized that the driving means for the rotor shaft 21 can be an intermittent or continuously operating type of drive and the only requirement is that it be synchronized with the operation of the electromagnet 94 so that for each cycle of operation of the electromagnet, only one brush element 26 is selectively positioned.

The use of a few wire strands to constitute a brush-like storage element 26 should not be underestimated since these brush elements have the qualities of flexibility both in a vertical and horizontal direction, small mass, ease of deflection, low wiping wear or friction, and good electrical contact. The flexibility of the strands and small mass at the outer ends of the arms 25 enables the camming surfaces 68 and 69 of the gating means 66 to readily deflect or position the brushes 26. Also, if the timing of the movement of a brush through the gating means 66 is accidentally such that the output mouth 67 is positioned directly in front of the knife edge on the barrier 63, the wire brush would not shatter, bend and break as would a solid one-piece metal wiper, but would merely divide. While this may provide a faulty signal, the next revolution of the brush element 26 collects the strands together and places them on one side of the barrier element 63. The brush elements 63 also have an additional advantage over solid one-piece elements, that is, if one of the strands bounces there is an excellent chance that one of the other strands will be in good electrical contact and in engagement with a segment so as to provide a current path at the sampling time. Moreover, the brushes are found to have long life and are subject to little wear.

In summary, applicant has provided a mechanical shift register or storage device for storing incoming electrical signals of one or two conditions by moving elements to either a first or second position and has provided a segmented disc for enabling the simultaneous electrical read-out of a number of pulses or for the seriatim electrical read-out of pulses from a single pair of segments.

Although only one embodiment of the invention is shown in the drawings and described in the foregoing specification, it will be understood that invention not limited to the specific embodiment described, but is capable of modification and rearrangement and substitution of parts and elements without departing from the spirit of the invention.

What is claimed is:

1. A mechanical shift register for translating seriatim input signals of a first or second condition into simultaneous, parallel output signals comprising;

(a) a plurality of elements successively movable about an axis at a predetermined rate, (b) a stationary means divided into a first and a second portion corresponding to a first and a second condition of a signal, (c) gating means for positioning said elements on either said first and second portion in accordance with the condition of a signal being received, (d) electrically responsive means responsive to input signals of said first and second conditions for actuating said gating means to position said elements on the portions of the stationary means corresponding to the conditions of the signal being received, (e) a plurality of segment means on each portion of said stationary means and electrically isolated from one another, said segment means being engageable by said rotatable elements, and (f) parallel output means associated with predetermined ones of the said segment means to read out simultaneously the position of a predetermined number of rotatable elements.

2. The combination with the mechanical shift register of claim 1, of barrier means for dividing said stationary means into the two portions and for blocking movement of a rotatable element to an opposite portion while said rotatable element is moving over the portion to which it has been directed by the gating means.

3. The mechanical shift register of claim 1 wherein said rotatable elements are constituted by brush means having their free ends in wiping engagement with said segment means, said free ends of said brush means being laterally deflected by said gating means into said first or second portions.

4. The mechanical shift register of claim 1, adapted to receive and register incoming intelligence signals of a telegraph code combination having start and stop signals which also includes a driving means for moving said elements into said gating means at a predetermined rate corresponding to the rate at which the intelligence elements of the code combinations are received, said driving means being inoperative to move elements into said gating means while receiving start and stop signals whereby said start and stop signals are not mechanically stored by elements and only intelligence signals are stored by the positioning of said elements.

5. The mechanical shift register of claim 1 including an electrical input means common to all of said elements to provide an electrical path through said elements and through a segment engaged thereby to said output means.

6. A mechanical storage device for storing incoming electrical signals of first and second conditions and for providing a serial output representation thereof at a predetermined later time interval comprising:

(a) a plurality of conductive elements movable at a predetermined rate and positionable into first and second positions representative of first and second conditions of an electrical signal, (b) stationary means having a plurality of individual, electrically isolated, contact segments, said contact segments being divided into an inner and outer ring of segments, (c) gating means for directing said conductive elements into engagement with one or the other of said rings of segments, (d) signal responsive means responsive to an incoming electrical signal of a first condition to position said gating means to direct a conductive element to an inner ring of segments and responsive to an incoming signal of a second condition to position said gating means to direct a conductive element to the outer ring of segments, and (e) an output means having a first conductor connected to one of said inner rings of segments and a second conductor connected to one of said outer rings of segments to provide a conducting path through said conductive element and the segment with which a conductor element is in contact.

7. The mechanical storage device of claim 6 adapted to receive and store incoming intelligence signals of a telegraph code combination having start and stop signals wherein a driving means moves said rotatable conductors at a predetermined rate of speed while receiving the intelligence signals and is inoperative to drive said rotatable elements while said signal responsive means is responding to said start and stop signals.

8. The mechanical storage device of claim 6 wherein said conductive elements are flexible elements capable of flexure in at least two directions and biased in one direction into association with said inner and outer row of segments, said elements being biased in a second direction to move towards one of said rings of segments.

9. A mechanical storage device for storing seriatim input signals of a first or second condition for later readout comprising:

(a) a frame means, (b) a segmented disc supported by said frame means and divided into a plurality of electrically isolated conducting segments, (c) a plurality of electrically conductive and settable wiper means movable to a first or second position corresponding to an electrical signal of a first or second condition, (d) gating means through which said settable elements are moved to either a first or second position, (e) electro-responsive means responsive to electrical input signals of a first condition to cause a settable wiper means to move through said gating means to a first position and responsive to an electrical signal of said other condition to cause said settable wiper means to move through said gating means to the second of said positions, and (f) circuit means for completing an electric readout path to determine whether said settable wiper means is in the first or second position, said electrical path including said wiper means and the conducting segment in engagement with said wiper means.

10. A mechanical shift register for storing serially received input signals of a first and second condition for later readout comprising:

(a) a stationary stator means, (b) a plurality of electrically isolated and electrically conductive segments on said stator means, said segments being arranged in a circular manner, (c) a barrier means dividing said segments into inner and outer rings of segments, (d) rotor means rotatable at a predetermined rate equal to the rate of the incoming signals to be stored, (e) a plurality of electrically conductive brush means individually secured to said rotor means and having free ends adapted to engage said segments on said stator means, (f) gating means for guiding the free ends of said brush means to either said inner ring of segments or said outer ring of segments, (g) an electrical input means common to all of said brush means, and (h) a plurality of individual output leads, one of said output leads connected to an inner segment and the other of said output leads connected to the radially associated outer segments in the outer ring of segments whereby an electrical path is completed from said common input means and through said brush means and the segment with which said brush means is in contact to said output means connected to this segment.

References Cited by the Examiner

UNITED STATES PATENTS

| | | | |
|---|---|---|---|
| 2,866,869 | 12/1958 | Sinninger | 178—52 |
| 2,921,978 | 1/1960 | Dingley | 178—53.1 |
| 3,219,758 | 11/1965 | Brothman | 340—364 X |

DAVID G. REDINBAUGH, *Primary Examiner.*

S. J. GLASSMAN, *Assistant Examiner.*